United States Patent [19]

Janssen

[11] 4,399,170

[45] Aug. 16, 1983

[54] METHOD FOR SMOOTHING WALLBOARD TAPE JOINTS

[75] Inventor: Craig R. Janssen, Arden Hills, Minn.

[73] Assignee: Padco, Inc., Minneapolis, Minn.

[21] Appl. No.: 416,844

[22] Filed: Sep. 13, 1982

Related U.S. Application Data

[62] Division of Ser. No. 232,708, Feb. 9, 1981.

[51] Int. Cl.$^3$ ........................ B05D 1/28; B29C 23/00

[52] U.S. Cl. ........................ 427/336; 156/71; 264/35; 264/129; 264/162; 264/256; 427/368

[58] Field of Search ................ 264/162, 129, 35, 259, 264/263, 256; 427/356, 368, 336, 494; 156/71; 52/288, 417, 514, 749, 743, 747

[56] References Cited

U.S. PATENT DOCUMENTS

| | | | |
|---|---|---|---|
| Re. 26,382 | 4/1968 | Tillisch et al. | 52/417 |
| 1,921,252 | 8/1933 | Graf | 15/244 |
| 1,954,641 | 4/1934 | Mathes | 15/122 |
| 2,114,892 | 4/1938 | Vaughn | 300/21 |
| 2,958,593 | 11/1960 | Hoover et al. | 51/295 |
| 2,975,453 | 3/1961 | Imhof | 15/210 |
| 3,117,334 | 1/1964 | Imhof | 15/210 |
| 3,171,820 | 3/1965 | Volz | 260/2.5 |
| 3,391,037 | 7/1968 | McNulty | 156/71 |
| 3,444,579 | 5/1969 | Thomford | 15/118 |
| 3,629,894 | 12/1971 | Stefany | 15/146 |
| 4,157,271 | 6/1979 | Moore | 156/71 |
| 4,264,337 | 4/1981 | Fenster et al. | 51/295 |

OTHER PUBLICATIONS

"PM Workbench," *Popular Mechanics*, p. 46, Jan. 1981.

*Primary Examiner*—Willard E. Hoag
*Attorney, Agent, or Firm*—Kinney, Lange, Braddock, Westman and Fairbairn

[57] ABSTRACT

A finishing tool is used to smooth tape joints of interior walls and ceilings constructed of plasterboard or drywall. The tool includes a handle, a resilient polyester foam pad, and a wettable abrasive surface of short, stiff coarse nylon fibers bonded to the resilient foam pad so that they are oriented perpendicular to the surface of the foam pad. In use, the abrasive surface is wetted, and then is moved over the surface of the tape joint to moisten the joint cement. The tool is then moved in a scrubbing-type movement to work the joint cement to a creamy consistency. The surface of the joint cement is then smoothed by stroking the tool along the length of the joint.

4 Claims, 3 Drawing Figures

METHOD FOR SMOOTHING WALLBOARD TAPE JOINTS

This is a division of application Ser. No. 232,708, filed Feb. 9, 1981.

BACKGROUND OF THE INVENTION

1. Field of the Invention

The present invention relates to tool for smoothing the joints of interior walls constructed of plaster board or drywall.

2. Description of the Prior Art

One extremely common form of construction of interior walls and ceilings uses plaster board or drywall wallboard. These wallboard joints between two adjacent wallboards are commonly "taped" so that they are not noticeable.

The taping of wallboard joints has in the past been a relatively complicated, time consuming, messy, and often frustrating procedure, particularly for persons who are constructing interior walls and ceilings on a 'do it yourself' basis. The traditional method of smoothing taped joints involves the applying three coats of wallboard joint compound, which is commercially available in both ready-mixed and powder form. In the case of its powder form, the wallboard joint compound powder is mixed with water to form a paste.

The first step of taping a wallboard joint involves applying a thick layer of joint compound which completely fills the seam formed by the two abutting wallboard sheets.

The next step is to embed wallboard tape into the thick layer of joint compound. The wallboard tape is a perforated paper tape having a width of about two inches, and which is normally sold in rolls. The tape is centered over the length of the seam and is pressed into the thick first layer of joint compound so that the compound oozes through the perforations of the tape. A wallboard knife is usually used to press the tape into the first layer of joint compound.

After the first layer of joint compound (with embedded tape) has dried, it is usually sanded smooth with dry sandpaper wrapped around a sanding block. This sanding step is particularly necessary if the surface of the first layer of joint compound is rough.

A second thin layer of joint compound is then applied over the first layer of joint compound and the wallboard tape. This second layer joint compound is wider (generally about 6 to 8 inches) than the first layer.

After the second layer has dried, sanding of the second layer is once again performed to smooth the joint. A third thin layer of joint compound is then applied over the second layer. This third layer is feathered out to about 12 to 14 inches from the center of the joint.

When the third coat of joint compound is thoroughly dry, it is sanded with a dry medium sandpaper. Once the surface of the wallboard joint is smooth and even, a primer coat is applied.

In the past, smoothing wallboard tape joints has been the messiest step in building an interior room. The residual dust that is formed by sanding makes a mess and is difficult to clean up.

The dust from sanding often becomes airborne, which spreads the dust further, and makes working in the room unpleasant. In addition, if water drips on the dust it forms cement which must be scraped up.

There has been a continuing need for an improved method of smoothing wallboard tape joints which is easier and less messy than the conventional prior art methods.

SUMMARY OF THE INVENTION

The present invention is an improved tool and method for smoothing wallboard tape joints. The tool of the present invention includes a handle, a resilient foam pad, and a wettable abrasive surface. The wettable abrasive surface is formed by coarse, short, stiff synthetic polymer fibers bonded to the resilient foam pad so that they extend perpendicularly to a first major surface of the resilient foam pad. The handle is attached to the resilient foam pad adjacent the second, opposite major surfaces. The device of the present invention permits smoothing of wallboard tape joints without the mess associated with dry sanding.

In use, the tool of the present invention is first dipped in water and is used to wet the entire tape joint area. The tool is then moved over the surface of the tape joint in a scrubbing type motion until the surface of the joint compound softens to a creamy consistency. The abrasive surface of the tool is rubbed against the wet joint compound to wear down and smooth out rough areas. A final smoothing of the joint is performed with quick strokes of the tool along the length of the joint.

With the present invention, the tool wears down surfaces quickly and safely, leaving the joints smooth and ready for painting or wallcovering. Because the tool is used with water, there is no airborne dust to breathe or clean up.

It has been discovered that particularly excellent results are provided when the wettable abrasive surface is formed by coarse short, stiff nylon fibers which are electrotatically flocked onto and bonded to the resilient foam so that they extend perpendicularly to the first major surface of the pad. In particular, nylon fibers of 100 Denier diameter and 0.100 inch length have been found to provide excellent abrasive properties, particularly when softening and wearing down joint compound.

DETAILED DESCRIPTION OF THE PREFERRED EMBODIMENT

Figure 1:
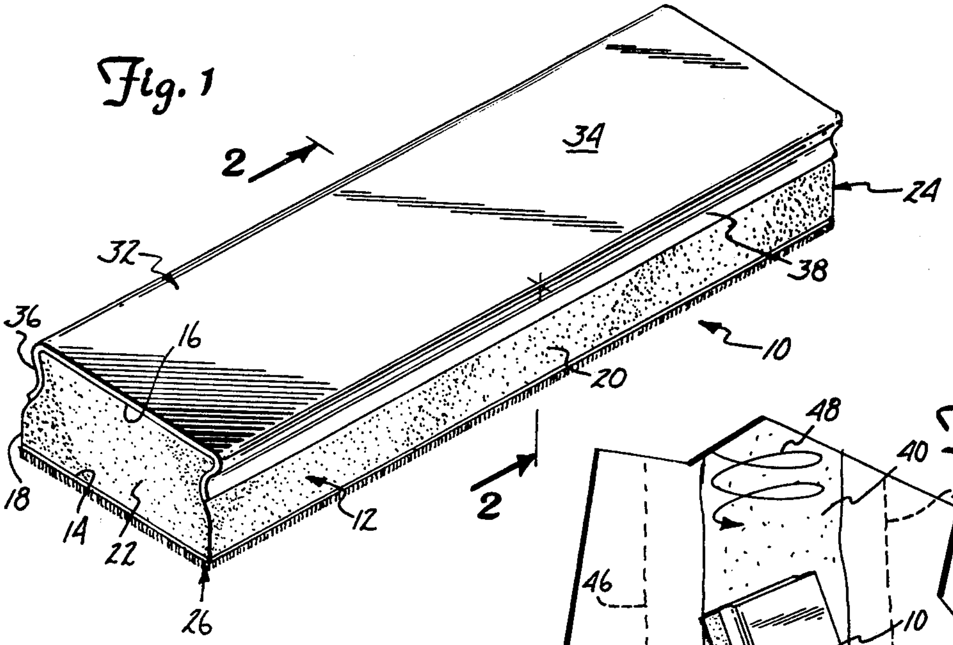
FIG. 1 is a perspective view of the wallboard joint smoothing tool of the present invention.
Figure 2:
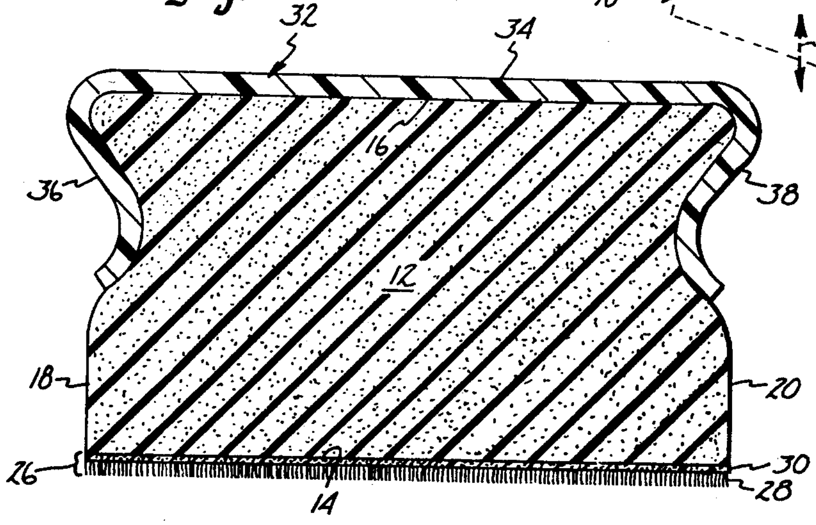
FIG. 2 is a sectional view along section 2—2 of FIG. 1 showing the tool of the present invention.

FIGS. 1 and 2 show the preferred embodiment of smoothing tool 10 of the present invention. Smoothing tool 10 includes generally rectangular resilient pad 12, which has bottom and top major surfaces 14 and 16, sides 18 and 20, and ends 22 and 24. Bonded to bottom surface 14 of resilient pad 12 is wettable abrasive surface 26. In the preferred embodiment of the present invention illustrated in FIGS. 1 and 2, abrasive surface 26 comprises a plurality of coarse, short, stiff fibers 28 which are bonded to bottom surface 14 of pad 12 by adhesive layer 30. Fibers 28 are oriented generally perpendicularly to bottom surface 14, with their upper ends embedded in adhesive layer 30 and their lower ends free.

Mounted on the upper half of pad 12 is handle 32, which provides a stiff backing for pad 12, and provides convenient grips for gripping tool 10. Handle 32 has an inverted generally U-shaped cross-section, with top surface 34 adjacent top surface 16 of foam pad 12, and a pair of downwardly extending side flanges 36 and 38. In the embodiment shown in FIGS. 1 and 2, side flanges 36 and 38 are generally concave, so that side flanges 36 and 38 press into and compress sides 18 and 20 of pad 12. Since handle 32 is generally rigid, while foam pad 12 is compressible, handle 32 is held securely in place on pad 12 by side flanges 36 and 38. The concave portions of side flanges 36 and 38 also provide grips for gripping tool 10 when it is in use.

In one highly successful embodiment of the present invention, foam pad 12 is a non-reticulated polyester foam, and handle 32 is an extruded polystyrene plastic. The dimensions of foam pad 12 are about ten (10) inches long, about two and one-half (2½) inches wide, and about one and one-half (1½) inches thick. Handle 32 also has a length of ten (10) inches so that handle 32 also provides backing for foam pad 12 along its entire length. Handle 23 has a width of about two and three-fourths (2¾) inches at top 34, and a width of about two and one-fourth (2¼) inches at its narrowest point near the bottom of side flanges 36 and 38. The height of handle 32 (from top 34 to the bottom edges of flanges 36 and 38) is about three-fourths (¾) inch, which is approximately one-half (½) of the thickness of pad 12. As a result, the normal pressures applied to pad 12 are not so great that pad 12 will be compressed to a point where the lower edges of flanges 36 and 38 could scrape the surface of the tape joint. The length and width dimensions of pad 12 dictate the dimensions of abrasive surface 26, since in the preferred embodiments abrasive surface 26 covers the entire area of bottom surface 14 of pad 12. The preferred length of pad 12 and abrasive surface 26 permits tool 10 to cover essentially the entire width of a typical wallboard taped joint. As will be discussed later, this is important so that the tool 10 can be used to apply water to the surface of the joint at the beginning of the smoothing operation and to wisk smooth the final surface of the joint at the end of the smoothing operation. The preferred widths of pad 12 and abrasive surface 26 provide adequate coverage and smoothing action while permitting the tool to be narrow enough to be easy to use.

In one highly successful embodiment of the invention, fibers 28 ae nylon fibers having a thickness of about 100 Denier and a length of about 0.100 inch. Fibers 28 are electrostatically flocked onto bottom surface 14 of foam pad 12 and bonded by adhesive 30. This process of attachment of fibers 28 to foam pad 12 is similar to the process commonly used to fabricate the surfaces of paint applicator pads, wallpaper, and other velour-like surfaces. The process results in the fibers being generally aligned perpendicular to bottom surface 14 of pad 12. The nylon fibers 28 used to form abrasive surface 26 are about the same length as the nylon fibers used in forming paint pads, but are substantially more coarse. In particular, the fibers used in forming paint pad applicator surfaces have a thickness of about eighteen (18) Denier, while the preferred thickness of fibers 28 used to form abrasive surface 26 of the present invention are approximately five times as coarse (about 100 Denier). As a result, instead of providing a relatively smooth non-abrasive surface (as in the case of paint applicator pads), fibers 28 cause abrasive surface 26 to be coarse and abrasive, and extremely effective in wearing down and smoothing out wallboard joint compound.

Applicant has also experimented with other abrasive surfaces, such as non-woven nylon mesh like that shown in the Hoover U.S. Pat. No. 2,958,593 with a thickness of about one-fourth (¼) inch. It has been found, however, that abrasive surface 26 of the present invention (as illustrated in FIGS. 1 and 2) exhibits substantially improved performance. In particular, abrasive surface 26 of FIGS. 1 and 2 has been found to be more abrasive and less prone to clogging than the nylon mesh.

Figure 3:
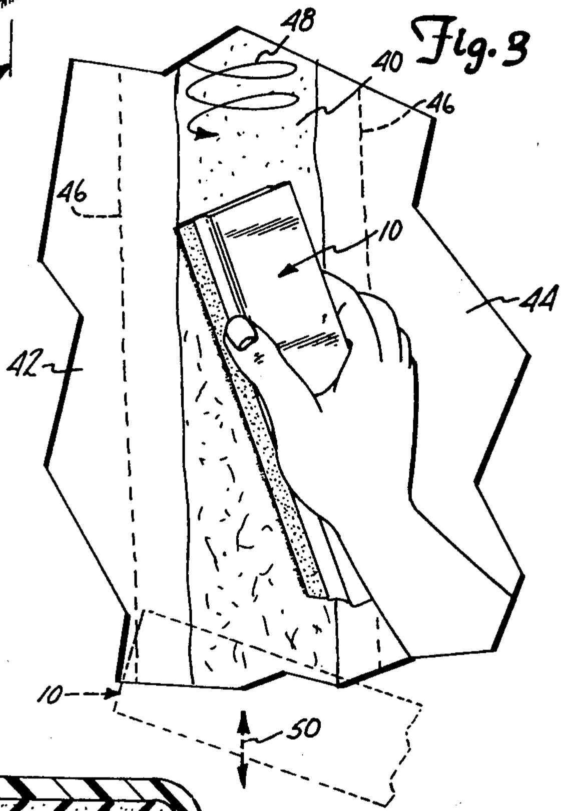
FIG. 3 is a perspective view illustrating the use of the tool of FIGS. 1 and 2 in the smoothing and finishing of wallboard tape joints.

FIG. 3 illustrates the use of smoothing tool 10 of the present invention in smoothing wallboard tape joint 40. In FIG. 3, a pair of wallboards 42 and 44 abut one another, and wallboard tape joint 40 has been produced to cover the seam between wallboards 42 and 44. The forming of tape joint 40 is generally according to the conventional techniques discussed previously. With the present invention, however, tool 10 is used to smooth tape joint 40 instead of the conventional sanding steps used in the prior art.

In use, tool 10 is first dipped in clean water so that foam pad 12 and abrasive surface 26 are wet. Tool 10 is then run longitudinally along the entire length of tape joint 40 to moisten the entire tape joint area. Dashed lines 46 shown in FIG. 3 illustrate the width of an area which is moistened by tool 10. Alternatively, tape joint 40 can be moistened by spraying with water or by other suitable means.

Once tape joint 40 has been moistened, tool 10 is moved in a scrubbing type circular motion illustrated by circular arrow 58 to lightly scrub the surface of tape joint 40. This circular scrubbing is continued until the tape joint compound of joint 40 softens to a creamy consistency. Tool 10 is then used to smooth out the surface of joint 40, while the tape joint compound has a creamy consistency. It has been found most effective to wear down the roughest area of joint 40 first, applying more water to joint 40 as needed by diping tool 10 in water to again moisten foam pad 12 and abrasive surface 26.

Once the tape joint compound has been smoothed and spread out by tool 10, the final strokes are provided by orienting tool 10 so that it covers the entire width of joint 40 and moving tool 10 longitudinally along the entire length of joint 40 as illustrated in phantom in FIG. 3. The movement of tool 10 along the direction indicated by phantom arrow 50, is usually in the form of quick "wisking" strokes.

Finishing tool 10 of the present invention has several important advantages. First, because abrasive surface 26 is wetted and the joint compound is also moistened, airborne dust (which is generated by traditional sanding of wallboard tape joints) is eliminated. Second, tool 10 wears down surfaces of joint 40 quickly and safely. Third, because of the resilient nature of pad 12, tool 10 greatly reduces the likelihood of the user applying too much pressure and thus digging too deeply into joint 40. This is a problem which can be encountered when conventional sandpaper is used. Fourth, tool 10 does not tend to clog as readily as sandpaper. Fifth, finishing tool 10 of the present invention is easy to clean. Best results have been obtained by immersing tool 10 in water, then squeezing out excess water from pad 12, and then towel-drying tool 10.

In conclusion, the present invention provides a substantial improvement to the finishing of wallboard joints. Although the present invention has been described with reference to preferred embodiments, workers skilled in the art will recognize that changes may be made in form and detail without departing from the spirit and scope of the invention.

What is claimed is:

1. A method of smoothing wallboard joint compound on wallboard tape joint, the method comprising:
   applying water to the joint to moisten the wallboard joint compound;
   scrubbing the joint with a smoothing tool having resilient foam pad with a wettable abrasive surface bonded to one major surface to work the joint compound to a creamy consistency, wherein the wettable abrasive surface of the smoothing tool comprises a plurality of coarse, short, stiff synthetic polymer fibers oriented generally perpendicularly to the major surface of the pad and bonded to the major surface by an adhesive layer; and
   smoothing the joint by stroking the creamy consistency joint compound with the smoothing tool.

2. The method of claim 1 wherein applying water to the joint comprises:
   wetting the smoothing tool with water; and
   applying water carried by the smoothing tool to the joint.

3. The method of claim 1 wherein smoothing the joint comprises stroking the joint longitudinally with the abrasive surface of the smoothing tool.

4. The method of claim 1 wherein the fibers are nylon fibers having a length of about 0.100 inch and a thickness of about 100 Denier.

* * * * *